United States Patent
Marquis et al.

(10) Patent No.: US 8,672,558 B2
(45) Date of Patent: Mar. 18, 2014

(54) APC ADAPTER

(75) Inventors: Andrew R. Marquis, Medford, MA (US); Stephen C. Rose, Braintree, MA (US); Gerald G. Sullivan, Chelmsford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1054 days.

(21) Appl. No.: 11/764,894

(22) Filed: Jun. 19, 2007

(65) Prior Publication Data

US 2008/0317411 A1    Dec. 25, 2008

(51) Int. Cl.
    *G02B 6/38*    (2006.01)
(52) U.S. Cl.
    USPC ............................................. 385/73; 385/74
(58) Field of Classification Search
    USPC ............................................. 385/72, 73, 74
    See application file for complete search history.

(56) References Cited

U.S. PATENT DOCUMENTS

| | | | | |
|---|---|---|---|---|
| 6,854,900 | B2 * | 2/2005 | Lai et al. | 385/80 |
| 7,665,901 | B2 * | 2/2010 | Kewitsch | 385/73 |
| 8,480,310 | B2 * | 7/2013 | Kewitsch | 385/73 |
| 2007/0196053 | A1 * | 8/2007 | Kewitsch | 385/74 |
| 2008/0019642 | A1 * | 1/2008 | Kewitsch | 385/72 |

* cited by examiner

*Primary Examiner* — Uyen Chau N Le
*Assistant Examiner* — John M Bedtelyon

(57) ABSTRACT

Optical signals are transmitted via fiber optic cables. The cable ends have connectors that connect to fiber-optic adapters. The interface between a connector and its adapter typically creates unwanted signal reflections. These unwanted signal reflections are mitigated by including an eight degree angle-offset of one face of an optical fiber within the adapter itself, the other face of the optical fiber having no angle offset, and the adapter being contained within a rigid housing. The angle offset of the fiber optic face in the adapter is mated with a complementary angle offset of the optical fiber in the cable connector. Embodiments of the present invention avoid cable management issues presented by previous adapters that included flexible cable between its input and output the previous adapters being designed primarily as jumpers and not suitable for use in tight, crowded spaces.

2 Claims, 1 Drawing Sheet

APC ADAPTER

BACKGROUND

Telecommunication companies are now making fiber to the premises (FTTP) installations for establishing optical communication paths for telecommunication and data transmission purposes. Losses in optical signal may be caused by reflections at optical fiber cable interfaces, both connector/connector and connector/adapter interfaces. These interfaces are oriented at right angles (90 degrees) to the direction of signal propagation in standard or subscriber connections (SC) resulting in maximum reflection. Conventional connector designations include SC/UPC (subscriber connector/ultra physical contact), ST (straight tip), FC (fixed connection) and LC (Lucent connection), all of which provide 90 degree interfaces. In this document, when SC is used, it may designate all connectors that provide 90 degree interfaces.

These interfaces can be polished to mitigate this reflection. Typical hand polishing can be referred to as Physical Contact (PC) polishing which typically can reduce reflection to −30 dB back reflection. Further, these interfaces can be machine polished to Super Physical Contact (SPC) polish standards (−40 dB back reflection) or even to Ultra Physical Contact (UPC) polish standards (−50 dB back reflection). Regardless, with an SC interface polished to even UPC standards, there still can be reflections of the signal directly back towards the source of the signal, such as a laser, which can interfere with, and/or damage, that source.

One approach to further mitigating these interferences and losses is to cut and then polish the optical transmission media at a fiber optic cable connector end at what may typically be referred to as an "eight (8) degree angle" after which, when the optical media is inserted into a suitable adapter, it forms the optical interface. In other words, the resulting optical interface may comprise a fiber optic cable connector having the optical fiber at its end configured at 82 degrees to the direction of optical signal propagation, mated to a fiber optic cable adapter having the optical fiber at its mating end similarly configured at a complementary 82 degrees to the direction of optical signal propagation. The two 82 degree faces fit together virtually congruently and in a manner to minimize or avoid an air-gap there-between. The other end of the adapter is configured as an SC (90 degrees) adapter end and a flexible fiber-optic cable interconnects the two ends of the adapter. This kind of adapter is known in the art as an Angled Physical Contact (APC) adapter and has a standard green color coding at the 82 degree end and a standard blue color coding at the 90 degree end. The eight degree offset from the orthogonal direction to the incoming optical signal propagation direction causes any signal reflection from the interface to be likewise angularly offset from that signal propagation direction. This is generally far less problematic than that which results from reflections by an interface formed by an SC connector/adapter (90 degrees) because the angular offset reflections in an optical fiber, which has a light carrying core surrounded by light-absorbent cladding, are absorbed by that cladding.

However, the only APC adapter types available today necessarily include the aforementioned flexible cable length connecting its 82 degree face and its 90 degree face. These cable lengths can be typically one meter or more in lengths and these APC adapters may really be intended to be used as "jumpers." But, these jumper-type adapters are not useful in certain applications. For example, in network switching applications, there can typically be forty-eight (48) or more of these connections required in a small space—possibly in a one inch by 19 inch tray which fits into a standard nineteen inch rack. In this space-restricted environment, having forty-eight or more otherwise un-needed cable lengths dangling about creates a serious cable-management challenge. These excess cable lengths are literally in the way of those who need to operate and maintain this equipment at, for example, a central office of a telecommunications company. There is a need for an APC adapter that does not have a cable length connecting its 82 degree face to its 90 degree face.

DETAILED DESCRIPTION OF PREFERRED EMBODIMENTS

Figure 1:
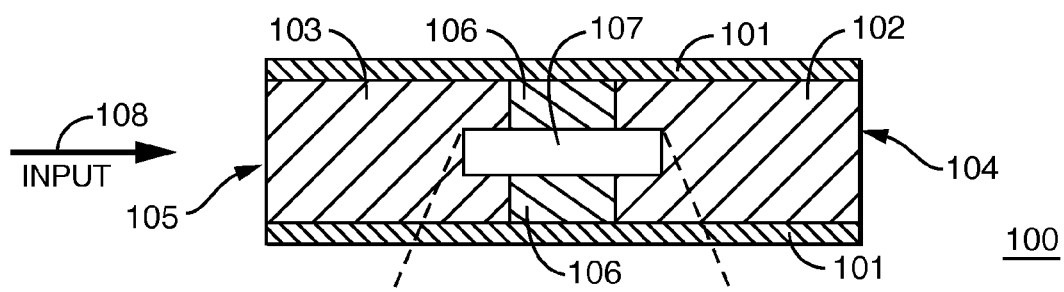
FIG. 1 is a schematic drawing of a side view, or longitudinal view, of commercially-available adapter apparatus in cross-section.

Exemplary embodiments include methodology and apparatus for providing an improved optical adapter, sometimes alternatively termed an optical connector. In an exemplary embodiment, an adapter apparatus is provided for operatively coupling an optical signal from a first optical cable to a second optical cable. In this apparatus, a relatively short, single and inflexible sleeve or housing, fabricated from plastic or other suitable rigid and insulative material, has both a first port which is configured to connect to the first optical cable and a second port which is configured to connect to the second cable. The connections can be snap-on connections, threaded connections or other suitable connections.

The housing encapsulates optical transmission media, such as an optical fiber, which may be ten microns in diameter and which extends from the first port of the housing to the second port of the housing. The media has been configured so that an end of the media located at the first port of the housing is a flat surface oriented at approximately an eighty-two (82) degree angle to the direction of transmission of the optical signal. The media can be further configured so that an end of the media located at the second port of the housing is a flat surface oriented at approximately a ninety (90) degree angle to the direction of transmission of the optical signal. This embodiment is particularly useful where the first optical cable has its optical media end cleaved at a complementary angle of eighty-two degrees to the direction of transmission of the optical signal and where the second optical cable has its optical media end cleaved at an angle of ninety degrees to the direction of transmission of the optical signal. In other words, this improved adapter embodiment permits two interfaces with the two attached cables, one such interface being a preferred 82 degree to 82 degree interface and the other interface being a standard connection (SC) interface, where both interfaces are supported by the same relatively small, rigid adapter housing. Any direct reflections from that second cable's 90 degree to 90 degree interface would necessarily be angularly-directed harmlessly by the first optical cable's 82 degree to 82 degree interface.

In another exemplary embodiment, a duplex adapter apparatus is disclosed through which an input optical signal is coupled from a first optical cable to a second optical cable, and an output optical signal is coupled from a third optical cable to a fourth optical cable. The adapter comprises a unitary and inflexible housing, constructed from suitable plastic or other similar rigid material, encapsulating input first and second housing ports as well as output first and second housing ports. The adapter housing length can be as short as an inch, more or less.

In this duplex embodiment, the input first housing port is configured to connect to the connector of the first optical cable and the input second housing port is configured to connect to the connector of the second optical cable. The output first housing port is configured to connect to the connector of the third optical cable and the output second housing port is configured to connect to the connector of the fourth optical cable. There are input and output optical signal transmission media, e.g., two separate optical fibers, both encapsulated by the same housing, the input optical signal transmission media extending from the input first housing port to the input second housing port, and the output optical signal transmission media extending from the output first housing port to the output second housing port.

In this duplex embodiment, the input optical signal transmission media is configured so that an end of the input optical signal transmission media located at the input first housing port is a flat surface oriented at approximately an eighty-two (82) degree angle to the direction of transmission of the input optical signal. The output optical signal transmission media is configured so that an end of the output optical signal transmission media located at the output first housing port is also a flat surface oriented at approximately an eighty-two (82) degree angle to the direction of transmission of the output optical signal.

Referring to FIG. 1, a commercially-available fiber optic cable adapter 100 is depicted in a side view, cross-sectional schematic drawing. Adapter 100 is comprised of a rigid, cylindrically-shaped sleeve or housing 101 which encircles and which, in turn, is supported by, rigid bulkhead 106 through which a cylindrically-shaped, empty conduit, or pass-through 107 has been formed co-axially with the longitudinal axis of sleeve 101. A standard cable connector (not shown) may be connected to left port 105 of the adapter by being inserted into aperture 103 the ferrule-encapsulated optical glass fiber of the connector being fitted within conduit 107, entering the conduit from the left side. Similarly, another standard cable connector (not shown) may be connected to right port 104 of the adapter by being inserted into aperture 102, the ferrule-encapsulated optical glass fiber of this other connector also being fitted within conduit 107, entering the conduit from the right side. ("Port" is intended to mean all of the mating structure, male and/or female, to permit operative coupling between the adapter and an optical connector, such structure having been configured into the sleeve/housing of one side of the adapter.)

Each of these optical glass fibers has a diameter of approximately ten microns, and each has a flat end which is cleaved at a 90 degree orientation to direction 108 of the incoming optical signal (not shown). A fiber ferrule can be approximately 2.5 mm in diameter. Thus, conduit 107 has a diameter which accommodates the diameter of the ferrule and which has been shown disproportionately large for ease of illustration. The two flat ends of the glass fiber mate, congruently, virtually without an air-gap there-between, inside conduit 107, when each connector is properly mated to its respective port within adapter 100. Nevertheless, a light-reflective interface is created at the surface of contact between the two flat ends of the optical glass fibers. This configuration, therefore, when accepting standard (SC) ninety degree fiber optic cable connectors on both ends of the adapter, is likely to cause deleterious signal reflections back to the source of the signal. Connections between the connectors (not shown) and adapter 100 can typically be made by snap connection or threaded connection (not shown) at both ends, and on the outside., of housing 101.

Figure 2:
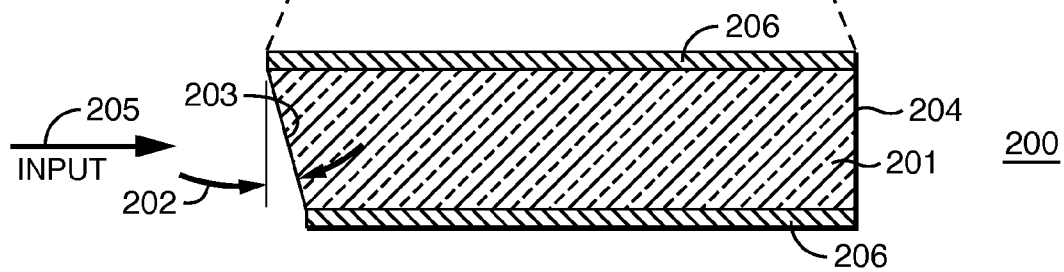
FIG. 2 is a schematic drawing, in cross-section, of a side, or longitudinal, view of optical transmission media for use in an exemplary embodiment of adapter apparatus configured in accordance with an exemplary embodiment.

FIG. 2 is a schematic drawing, in cross-section, of a side, or longitudinal, view of optical transmission media 201, e.g., a glass fiber, for use in an exemplary embodiment of adapter apparatus configured in accordance with an exemplary embodiment. A ferrule 206 encapsulates fiber 201. It should be understood that the ferrule is actually much thicker, or larger in diameter, than the thin encapsulation shown in the drawing; the ferrule is shown disproportionately small to enhance clarity of presentation. Ferrule 206, in its actual size, may be similar to the size of conduit 107 shown in FIG. 1 (as suggested by dashed lines 207) and can be supported in structure similarly configured to that shown in FIG. 1. Such structure offers both left and right (or first and second) ports for operative coupling to two optical connectors, similar to the connection described above with respect to FIG. 1. Optical fiber 201 (a glass optical fiber) extends from first end 203 to second end 204 and, in combination with ferrule 206, after insertion into conduit 107, forms a rigid, cylindrically-shaped, ferruled glass body 200.

One distinguishing characteristic in FIG. 2 is the angular offset 202 which is fashioned into end-face 203. This is accomplished by cutting and polishing the glass end into a flat surface oriented at approximately, or substantially, eight (8) degrees relative to the original orientation of that surface. In other words, end face 203 is set at 82 degrees relative to the direction 205 of an incoming optical signal (not shown). Actual angular displacement of angular offset 202, as shown in FIG. 2, is intentionally depicted at more than eight degrees for purposes of clarity of presentation. This configuration, when accepting a complementary 82 degree fiber optic cable connector (not shown) at the left port associated with first end 203 of ferruled optical fiber 200 shall not cause deleterious signal reflections back to the source of the signal. Rather, any reflections shall be directed towards the light-energy absorbent cladding (not shown) of the individual optical fiber (not shown) within the fiber optic cable. As the reflected light-energy in the optical fiber is absorbed by its cladding, reflected light energy becomes less of a problem to the operation of the source of the light signal, which can be a laser.

A cable connector (not shown) attached to second end 204 should be any of the standard or conventional fiber optic connectors such as SC/UPC, ST, FC, LC, etc. Although this would result in a 90 degree to 90 degree interface, any reflections coming from that interface would be appropriately managed by the angular offset located at first end 203. Appropriate green/blue standard color-coding on the outside housing of this adapter would be desirable to signify which cable connector hookups are permissible.

Figure 3:
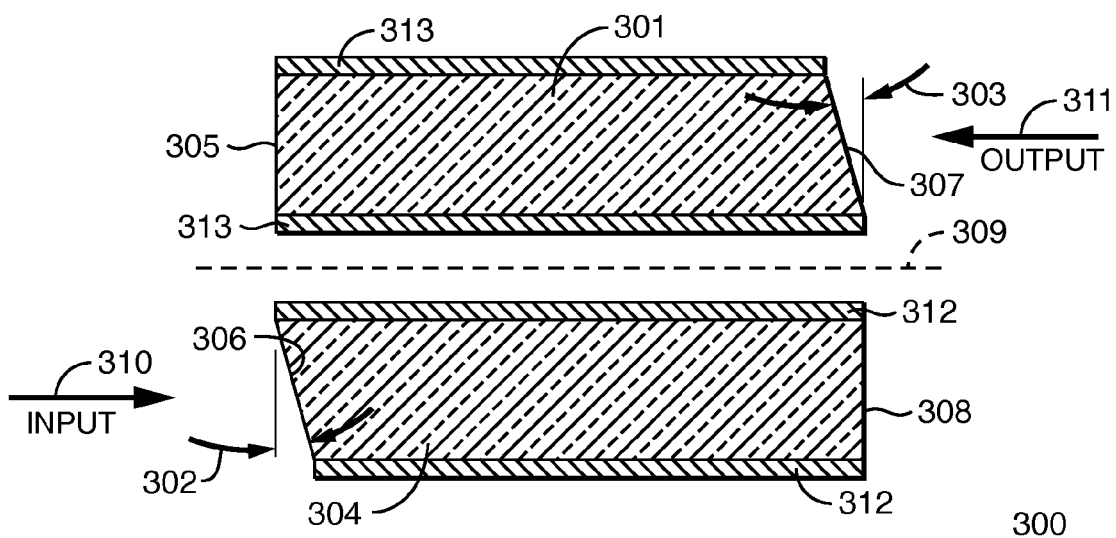
FIG. 3 is a schematic drawing, in cross-section, of a side, or longitudinal, view of optical transmission media for use in an exemplary duplex embodiment of adapter apparatus configured in accordance with an exemplary embodiment.

FIG. 3 is an exemplary side-view, cross-sectional schematic drawing of a duplex adapter apparatus alternative embodiment 300 configured according to an exemplary embodiment. Essentially, this adapter provides two separate and rigid pathways for two oppositely-transmitted optical signals contained within the same rigid housing (not shown). It should be understood that the two ferruled, optically-separate pathways are schematically shown in close proximity to each other for ease of illustration, schematic boundary 309 showing a separation between one pathway and the other. Optical fiber 304 is contained within ferrule 312 and optical fiber 301 is contained within ferrule 313. As in FIG. 2, these ferrules are shown disproportionately small to enhance clarity of presentation. In physical reality, these pathways would be separated sufficiently to permit a total of four ports, each port being associated with a different one of the four ends of optical fibers 301 and 304.

In the first pathway, an input optical signal (not shown) having signal transmission direction 310 and being applied via a first (input) cable connector (not shown) to the left port associated with input first end 306 of ferruled optical fiber 304 is transmitted via optical fiber 304 to a second (input) cable connector (not shown) connected to the right port associated with input second end 308 of optical fiber 304. A second cable (not shown) is connected from the second cable connector to carry the input optical signal to its destination. Offset angle 302 of eight (8) degrees is provided as discussed above, to permit light reflections to be absorbed by the cladding (not shown) of the optical fiber within the first cable. Optical fiber 304 functions essentially equivalently to operation of the embodiment shown in FIG. 2.

In the second pathway, shown above the first pathway, an output optical signal (not shown) having signal transmission direction 311 and being applied via a third (output) cable connector (not shown) to the right port associated with output first end 307 of ferruled optical fiber 301 is transmitted via optical fiber 301 to a fourth (output) cable connector (not shown) connected to the left port associated with output second end 305 of optical fiber 301. A fourth cable (not shown) is connected from the fourth cable connector to carry the output optical signal to its destination. Offset angle 303 of eight (8) degrees is provided, as discussed above, to permit light reflections to be absorbed by the cladding (not shown) of the optical fiber within the third cable. Optical fiber 301 operates essentially equivalently, but in reverse signal propagation direction, to the operation of the embodiment shown in FIG. 2.

It should be understood that the two pathways in FIG. 3 are optically de-coupled from each other, but are both contained within the same rigid adapter housing. As noted, the pathways are shown schematically in close proximity to each other for ease of illustration. Accordingly, there is sufficient space allocated to the housing to accommodate four ports, each port capable of connecting to a fiber optic cable connector. Connections between the connectors (not shown) and the housing can typically be made by snap connection or threaded connection.

As shown in the various embodiments discussed above, the inflexible and small adapters of an exemplary embodiment each include at least one fiber optic face polished at an offset angle to mitigate unwanted light energy reflections by causing those reflections to be absorbed in the cladding of the fiber in the cable carrying the signal to the adapter. This permits an operative connection to be made between an incoming signal cable and an outgoing signal cable with unwanted reflections being substantially mitigated via the adapter mechanism which is contained within its rigid adapter housing. There is no additional jumper cable length running between input and output of the adapter, thereby providing a technique for making a fiber optic connection in a close-quarters environment, such as within a one inch high equipment tray supported by a 19 inch equipment rack. Many of these connections can be made, using a plurality of these small, rigid adapters constructed in accordance with an exemplary embodiment, in a convenient and efficient manner and without being challenged by a cable management issue. The resultant adapters of particular exemplary embodiments permit an APC connector from one cable to connect via the adapter to any other conventional connector (SC/UPC, ST, FC, LC, etc) from another cable.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. Apparatus for operatively coupling an optical signal from a first optical cable to a second optical cable, comprising:
   a rigid angled-to-ninety-degree adapter for optical transmission, said adapter comprising:
   a single and inflexible housing having both a first housing port configured to connect to said first optical cable and a second housing port configured to connect to said second optical cable; and
   seamless optical signal transmission media in direct contact with both said first optical cable and said second optical cable, said media encapsulated by said housing and extending from said first optical cable connected to said first housing port to said second optical cable connected to said second housing port to provide a seamless optical path from said first optical cable to said second optical cable, said media having been configured so that an end of said media in said direct contact with said first optical cable is a flat surface oriented at approximately an eighty-two (82) degree angle to direction of transmission of said optical signal
   and so that an end of said media in said direct contact with said second optical cable is a flat surface oriented at approximately a ninety (90) degree angle to said direction of transmission of said optical signal.

2. Apparatus, comprising:
   a single and inflexible housing, containing rigid and angled-to-ninety-degree adapter means for operatively coupling an optical signal from a first optical cable to a second optical cable, said adapter means including:
   a first housing port for connecting to said first optical cable and a second housing port for connecting to said second optical; and
   a single optical fiber encapsulated by said housing and extending from said first optical cable to said second optical cable, an end of said optical fiber interfacing with said first optical cable being a flat surface oriented at approximately an eighty-two (82) degree angle measured from direction of transmission of said optical signal and an end of said optical fiber interfacing with said second optical cable being a flat surface oriented at approximately a ninety (90) degree angle to said direction of transmission.

* * * * *